(12) United States Patent
Rivera

(10) Patent No.: US 7,882,337 B2
(45) Date of Patent: Feb. 1, 2011

(54) METHOD AND SYSTEM FOR EFFICIENT TENTATIVE TRACING OF SOFTWARE IN MULTIPROCESSORS

(75) Inventor: Jose G. Rivera, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 504 days.

(21) Appl. No.: 11/751,007

(22) Filed: May 19, 2007

(65) Prior Publication Data

US 2008/0288761 A1   Nov. 20, 2008

(51) Int. Cl.
G06F 9/00 (2006.01)
G06F 9/30 (2006.01)
G06F 11/00 (2006.01)

(52) U.S. Cl. .................... 712/239; 714/45; 712/219
(58) Field of Classification Search .......... 712/239, 712/219; 714/45
See application file for complete search history.

(56) References Cited

U.S. PATENT DOCUMENTS

| | | | | |
|---|---|---|---|---|
| 4,787,062 A | * | 11/1988 | Nei et al. | 703/15 |
| 5,463,745 A | * | 10/1995 | Vidwans et al. | 712/218 |
| 7,194,731 B1 | * | 3/2007 | Cantrill | 717/128 |
| 2003/0084057 A1 | * | 5/2003 | Balogh | 707/100 |
| 2005/0149937 A1 | * | 7/2005 | Pilkington | 718/102 |
| 2005/0216653 A1 | * | 9/2005 | Aasheim et al. | 711/103 |
| 2006/0248319 A1 | * | 11/2006 | Kadambi | 712/234 |
| 2007/0061555 A1 | * | 3/2007 | St. Clair et al. | 712/242 |

OTHER PUBLICATIONS

Smolders, LR, "Techniques to Take Instruction Level Traces in an SMP Environment," TDB v40 n11, Nov. 1997, pp. 159-162, Austin.

* cited by examiner

*Primary Examiner*—Eddie P Chan
*Assistant Examiner*—William B Partridge
(74) *Attorney, Agent, or Firm*—Dillon & Yudell LLP

(57) ABSTRACT

A method of tentative tracing execution events in a multiprocessor system. Each processor stores tentative events in a corresponding buffer. The processor sets pointers in an array to a head and tail of a thread. When a condition triggers a tentative thread to be committed, the processor marks the first event as committed and sets the pointers to a null value. When a condition triggers the thread to be discarded, the processor marks the first event as discarded and sets the pointers to a null value. The processor makes the buffer available to a consumer process, which extracts the first event. If the first event is marked as committed, the consumer process follows a link to a second event of the thread and marks the second event as committed. If the first event is marked as discarded, the second event is marked as discarded and the first event is skipped.

20 Claims, 8 Drawing Sheets

METHOD AND SYSTEM FOR EFFICIENT TENTATIVE TRACING OF SOFTWARE IN MULTIPROCESSORS

BACKGROUND OF THE INVENTION

1. Technical Field

The present invention relates in general to data processing systems and in particular to multiprocessor systems. Still more particularly, the present invention relates to an improved method and system for tracing of execution events in a multiprocessor system.

2. Description of the Related Art

Computer software typically includes a stream of multiple interrelated events. Tentative tracing of software is the ability to collect execution events and to enable one or more execution events to be either discarded or committed as part of an execution trace. Each execution event is typically discarded or committed depending on the occurrence of another event in the future (e.g., when a condition becomes true or false).

In conventional data processing systems, tentative tracing can be intermixed with non-tentative tracing. A stream of events that is collected during a tracing process can thus include a mix of non-tentative events, which will unconditionally be part of the trace, and tentative events, which may or may not end up being part of the trace. Furthermore, conventional data processing systems can include simultaneous "threads" of tentative tracing that are all interleaved in the same stream of events. For each simultaneous thread that is traced tentatively, there is a different set of events and/or conditions that may trigger each event within the thread to be either discarded or committed at a future time (i.e., during execution of the thread).

In conventional multiprocessor systems, tentative events must be stored in one or more buffers in a way that enables the events to be committed or discarded efficiently in the future. Contention among multiple processors must also be minimized in order to enable efficient scaling of the system as the number of processors increases. Conventional multiprocessor systems typically minimize contention by including separate buffers for each processor that store the events generated by a particular processor. However, different processors may generate multiple tentative events for the same tentative thread, thereby causing tentative events of a single thread to be spread across different buffers that belong to different processors. Committing or discarding an event that is spread across different buffers thus requires that multiple buffers be accessed, which may lead to errors unless serialization techniques (e.g. spin lock synchronization) are utilized. Spin lock synchronization requires the execution of atomic memory access instructions every time the spin lock is accessed, thereby increasing the processing time and decreasing the overall efficiency of the multiprocessor system.

Conventional multiprocessor systems may also include separate buffers for tentative and non-tentative events. For example, a single processor system that includes M simultaneous threads of tracing activity would require M+1 different buffers, while a similar multiprocessor system with N processors would require N*(M+1) different buffers. Consequently, the combination of a large buffer size, a large number of tentative threads, and a large number of processors increases memory consumption dramatically as the system is scaled up. In order to commit a tentative event, it is also necessary to merge the buffer corresponding to the tentative event with the non-tentative event buffer in order to ensure that events appear in their original chronological order. Accurately estimating the total capacity of the tentative and non-tentative buffers is also difficult, as some tentative threads may include a high volume of tentative events, while other tentative threads may include a low volume of tentative events.

SUMMARY OF AN EMBODIMENT

Disclosed are a method, system, and computer program product for tentative tracing of execution events in a multiprocessor system. Each processor processes tentative events in a corresponding buffer. The processor sets a first pointer in an array corresponding to the processor to a head of a tentative execution thread and sets a second pointer in the array to a tail of the tentative thread. The processor posts commit requests and discard requests to multiple queues that correspond to each additional processor in the multiprocessor system. When an external condition triggers a tentative thread to be committed, the processor marks the first tentative event of the thread in the buffer as committed and sets the first and second pointers to a null value. When an external condition triggers the tentative thread to be discarded, the processor marks the first tentative event as discarded and sets the first and second pointers to a null value. The processor makes the buffer available to a consumer process, which extracts the first tentative event. If the first tentative event is marked as committed, the consumer process follows a link to a second tentative event in the thread and marks the second event as committed. Otherwise, the second tentative event is marked as discarded and the first tentative event is skipped by the consumer process.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a method, system, and computer program product for tentative tracing of execution events in a multiprocessor system.

Figure 1:
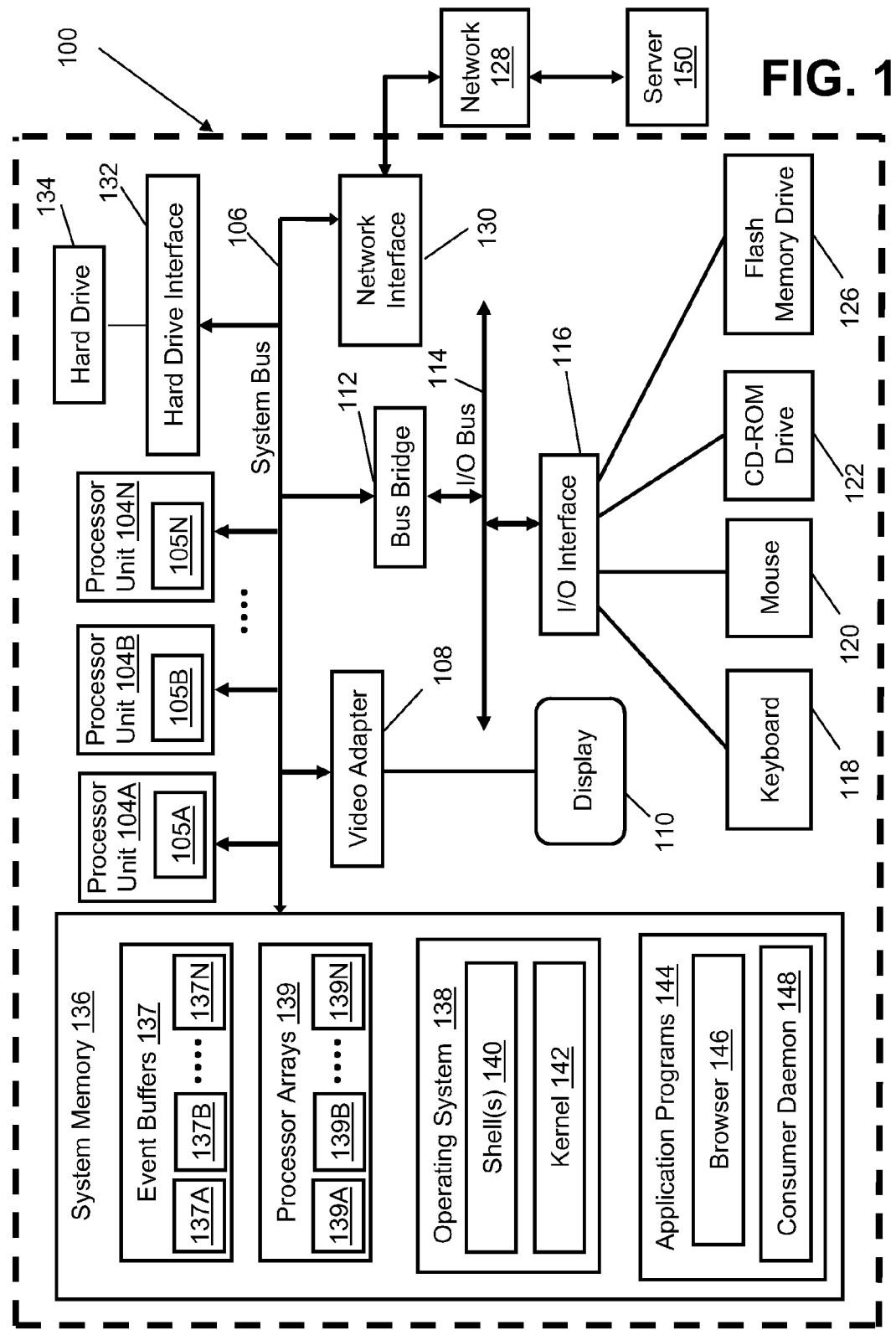
FIG. 1 depicts a high level block diagram of an exemplary multi-processor computer, according to an embodiment of the present invention.

With reference now to FIG. 1, there is depicted a high level block diagram of an exemplary multi-processor computer 100, according to an embodiment of the present invention. Computer 100 includes multiple processor units 104A through 104N that are coupled to system bus 106, where N is an integer that corresponds to the number of processors in computer 100. Processor units 104A through 104N include timer interrupt handlers 105A through 105N. Video adapter 108, which drives/supports display 110, is also coupled to system bus 106. System bus 106 is coupled via bus bridge 112 to Input/Output (I/O) bus 114. I/O interface 116 is coupled to I/O bus 114. I/O interface 116 affords communication with various I/O devices, including keyboard 118, mouse 120, Compact Disk-Read Only Memory (CD-ROM) drive 122, and flash memory drive 126. The format of the ports connected to I/O interface 116 may be any known to those skilled in the art of computer architecture, including but not limited to Universal Serial Bus (USB) ports.

Computer 100 is able to communicate with server 150 via network 128 using network interface 130, which is coupled to system bus 106. Network 128 may be an external network such as the Internet, or an internal network such as an Ethernet or a Virtual Private Network (VPN). Server 150 may be configured similarly to computer 100.

Hard drive interface 132 is also coupled to system bus 106. Hard drive interface 132 interfaces with hard drive 134. In one embodiment, hard drive 134 populates system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Code that populates system memory 136 includes Operating System (OS) 138, application programs 144, multiple event buffers 137A through 137N, and multiple processor arrays 139A through 139N. Event buffers 137A through 137N and processor arrays 139A through 139N correspond to processor units 104A through 104N, respectively. Computer 100 thus includes N event buffers. Processor units 104A through 104N utilize event buffers 137A through 137N and processor arrays 139A through 139N to perform the functions illustrated in FIGS. 3 through 5, which are discussed below.

OS 138 includes a shell 140, for providing transparent user access to resources such as application programs 144. Generally, shell 140 (as it is called in UNIX®) is a program that provides an interpreter and an interface between the user and the operating system. Shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include a browser 146. Browser 146 includes program modules and instructions enabling a World Wide Web (WWW) client (i.e., computer 100) to send and receive network messages to the Internet. Computer 100 may utilize HyperText Transfer Protocol (HTTP) messaging to enable communication with server 150. Application programs 144 in system memory 136 also include a consumer daemon 148. As utilized herein, a consumer daemon refers to a computer program and/or process that executes in the background and is not under the direct control of a user of computer 100.

The hardware elements depicted in computer 100 are not intended to be exhaustive, but rather represent and/or highlight certain components that may be utilized to practice the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention.

Within the descriptions of the figures, similar elements are provided similar names and reference numerals as those of the previous figure(s). Where a later figure utilizes the element in a different context or with different functionality, the element is provided a different leading numeral representative of the figure number (e.g., 1xx for FIG. 1 and 2xx for FIG. 2). The specific numerals assigned to the elements are provided solely to aid in the description and not meant to imply any limitations (structural or functional) on the invention.

Figure 2A:
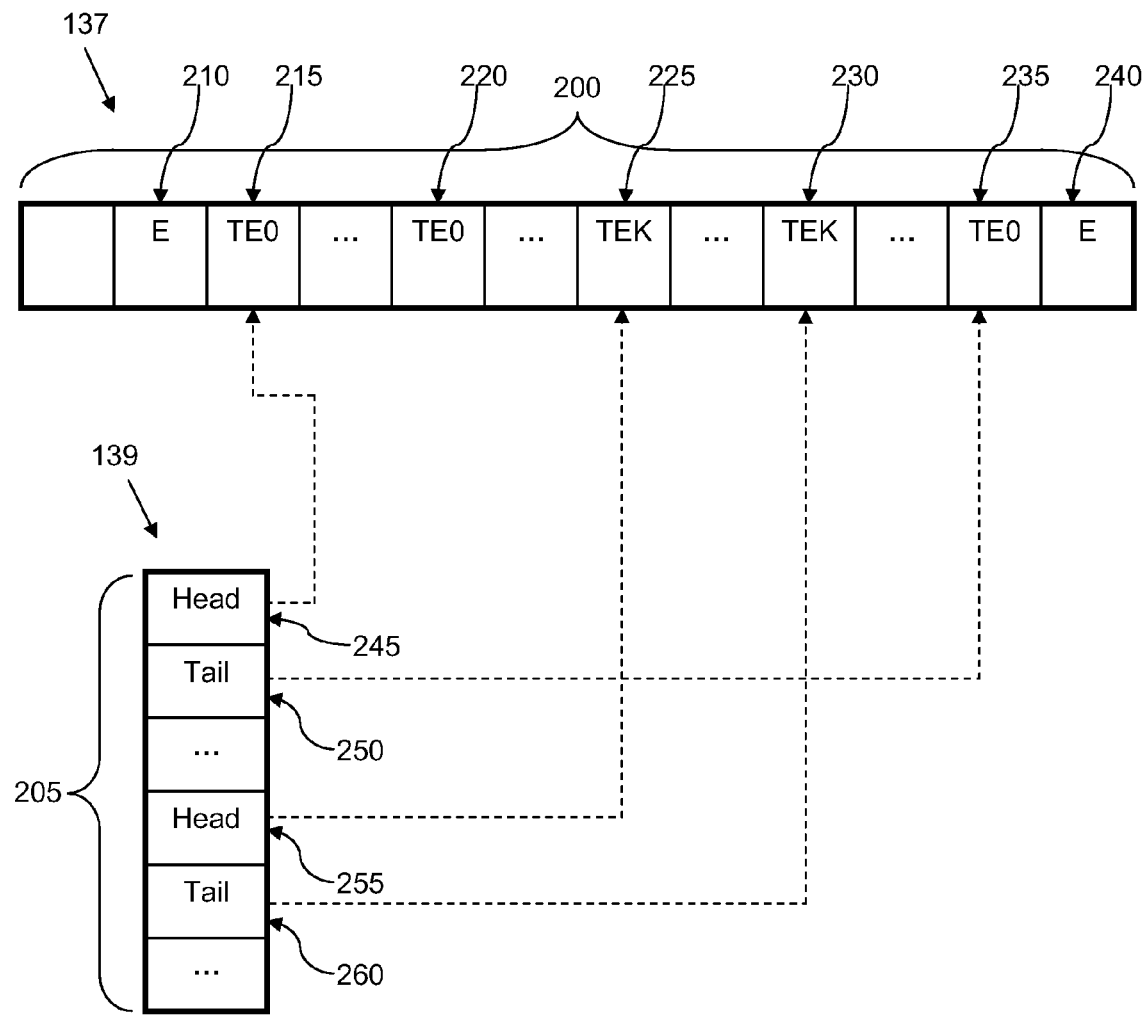
FIG. 2A illustrates an exemplary event buffer and an array that correspond to a processor, according to an embodiment of the present invention.

With reference now to FIG. 2A, there are depicted an exemplary event buffer and an array that correspond to a processor (e.g., event buffer 137N and array 139N for processor unit 104N), according to an embodiment of the present invention. As shown, event buffers 137A through 137N each include multiple event fields 200. Each event field 200 includes a tentative event or a non-tentative event. In one embodiment, each event is stored as a variable-length record within one or more event buffers, and the header of each event contains multiple fields, including, but not limited to, the length of the record, the type of the record (i.e., non-tentative event, unresolved tentative event, committed tentative event, and discarded tentative event), the event data, and a forward link to the next tentative event in the chain of tentative events for the same tentative processing thread. Each tentative thread is represented as a linked list of the tentative events associated with the tentative thread. The forward link field is thus not meaningful for non-tentative events and may be populated with a default value for non-tentative events.

According to the illustrative embodiment, the field corresponding to the type of a record within event buffer 137 contains an "E" value for a non-tentative event and a "TE" value for a tentative event. As shown, event buffer 137 includes non-tentative events 210 and 240. Event buffer 137 also includes tentative events 215 through 235. Tentative events 215, 220, and 235 correspond to the same tentative thread, referred to as "TE0". Similarly, tentative events 225 and 230 correspond to a different tentative thread, referred to as "TEK", where K is an integer. Event buffer 137 may thus include tentative events corresponding to multiple tentative threads.

Processor arrays 139A through 139N are associated with event buffers 137A through 137N, which correspond to processor units 104A through 104N. According to the illustrative embodiment, processor array 139 includes multiple linked list array fields 205 that correspond to the heads and tails of one or more tentative threads stored within event buffer 137. Processor array 139 contains only one head entry and one tail entry for each tentative thread within event buffer 137. For example, array field 245 contains a link to the head of tentative thread "TE0" (i.e., tentative event 215), and array field 250 contains a link to the tail of tentative thread "TE0" (i.e., tentative event 235). Similarly, array field 255 contains a link to the head of tentative thread "TEK" (i.e., tentative event 225), and array field 260 contains a link to the tail of tentative thread "TEK" (i.e., tentative event 230). The tentative events for each tentative thread are thus linked together in the event buffer of the corresponding processor, thereby enabling the processor to efficiently traverse the tentative thread (e.g., when committing or discarding a tentative event).

Figure 2B:
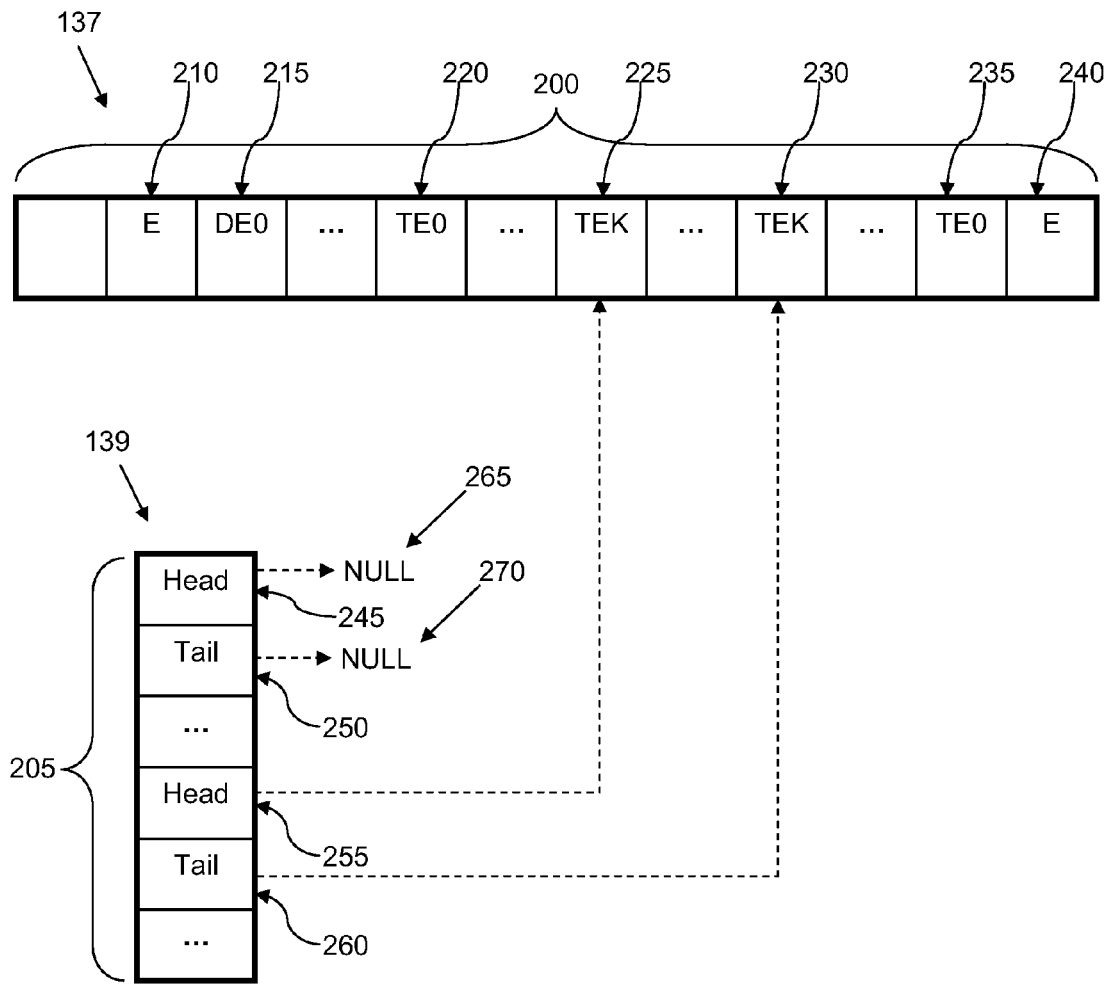
FIG. 2B illustrates the event buffer and processor array of FIG. 2A after discarding a tentative event, according to an embodiment of the present invention.

With reference now to FIG. 2B, there is depicted the event buffer and processor array of FIG. 2A after discarding a tentative event, according to an embodiment of the present invention. According to the illustrative embodiment, when a processor discards tentative event 215, the processor changes the type field of the record for tentative event 215 to a discarded value (e.g., "DE0"). The processor also updates array fields 245 and 250, which previously contained links to the head and tail, respectively, of the tentative event thread (i.e., "TE0"), to each contain a "NULL" value, since the processor has discarded tentative event 215 and thus discarded the entire corresponding tentative thread in a "lazy" fashion (i.e., tentative events marked "TE0" that are linked together are concurrently discarded in a serial manner). As shown in FIG. 2B, tentative event 215 thus contains a "DE0" value, and array fields 245 and 250 point to "NULL" values 265 and 270, respectively. "NULL" values 265 and 270 may be stored within system memory 136. In another embodiment, array fields 245 and 250 may instead be set to zero when the processor discards tentative event 215.

Figure 2C:
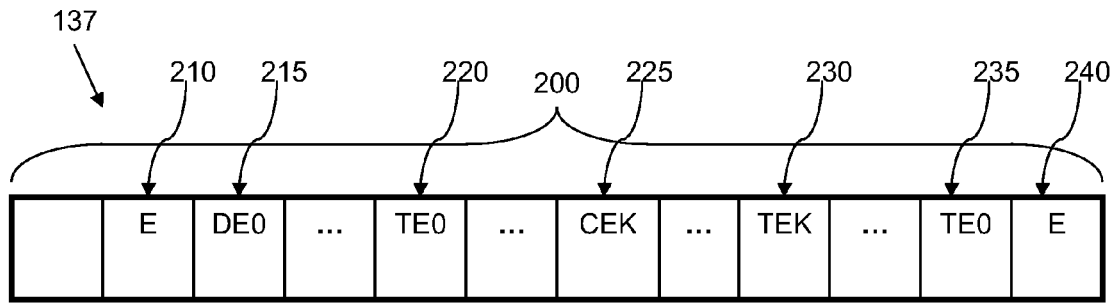
FIG. 2C illustrates the event buffer and processor array of FIG. 2B after committing a tentative event, according to an embodiment of the present invention.
Figure 2C:
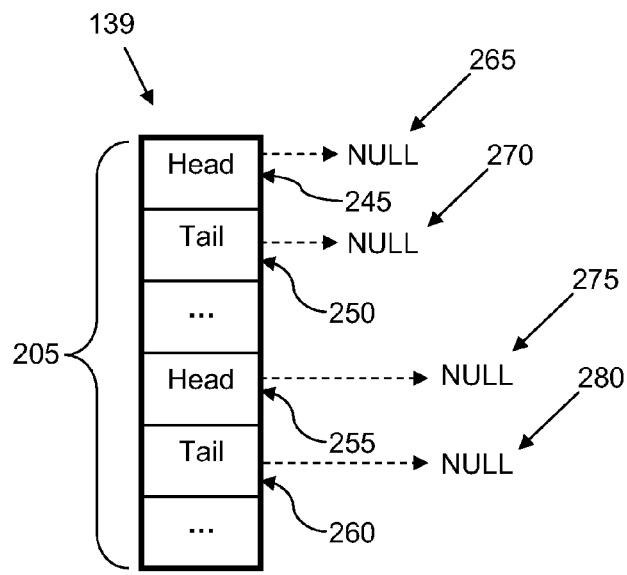

With reference now to FIG. 2C, there is depicted the event buffer and processor array of FIG. 2B after committing a tentative event, according to an embodiment of the present invention. According to the illustrative embodiment, when a processor commits tentative event 225 (i.e., the processor commits tentative thread K), the processor changes the type field of the record for tentative event 225 to a committed value (e.g., "CEK"). The processor also updates array fields 255 and 260, which previously contained links to the head and tail, respectively, of the tentative event thread (i.e., "TEK"), to each contain a "NULL" value, since the processor has committed tentative event 225 and thus committed the entire corresponding tentative thread in a "lazy" fashion (i.e., tentative events marked "TEK" that are linked together are concurrently committed in a serial manner). As shown in FIG. 2C, tentative event 225 thus contains a "CEK" value, and array fields 255 and 260 point to "NULL" values 275 and 280, respectively. "NULL" values 275 and 280 may be stored within system memory 136. In another embodiment, array fields 255 and 260 may instead be set to zero when the processor discards tentative event 225.

Figure 2D:
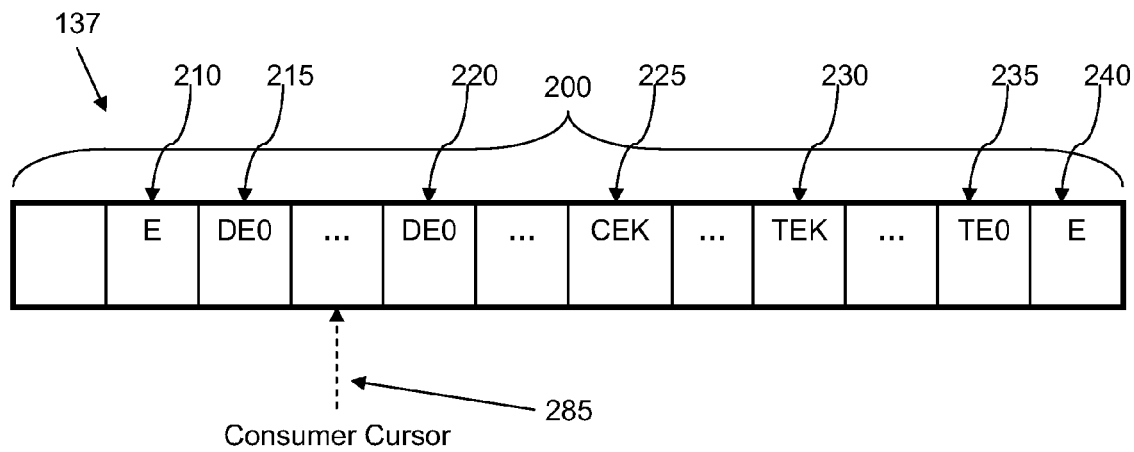
FIG. 2D illustrates the event buffer and processor array of FIG. 2C after a consumer daemon consumes a discarded tentative event, according to an embodiment of the present invention.

With reference now to FIG. 2D, there is depicted the event buffer and processor array of FIG. 2C after a consumer daemon consumes a discarded tentative event, according to an embodiment of the present invention. According to the illustrative embodiment, when a consumer process or daemon (e.g., consumer daemon 148) has consumed the first event that is marked as discarded (i.e., tentative event 215), consumer daemon 148 follows the link to the next tentative event in the same tentative thread (i.e., tentative event 220) and changes the type field of the record for tentative event 220 to a discarded value (e.g., "DE0"). Consumer daemon 148 also updates consumer cursor 285, which identifies the currently position of consumer daemon 148 during the execution (i.e., consumption) of the tentative thread. As shown, consumer cursor 285 thus points to a position between tentative event 215, which has been consumed, and tentative event 220, which is now also marked as discarded but has yet to be consumed.

Figure 3:
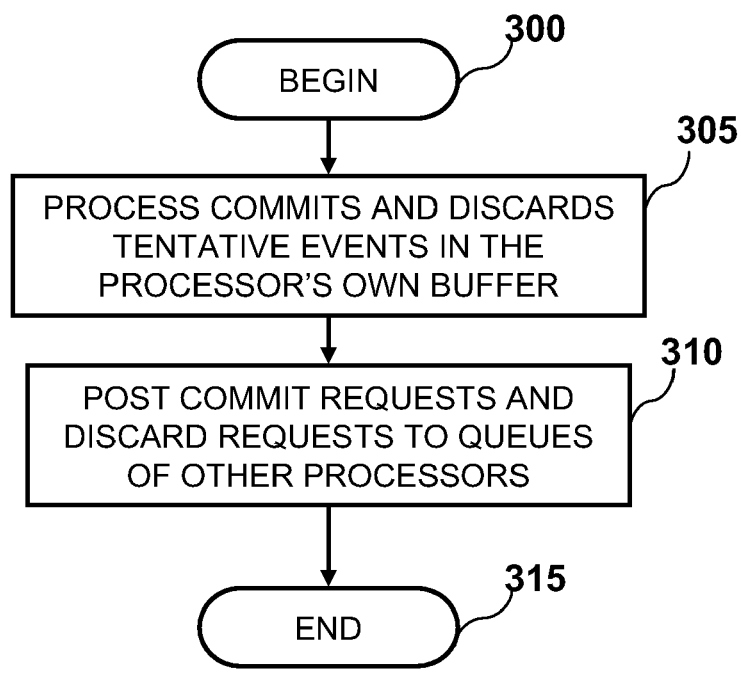
FIG. 3 is a high level logical flowchart of an exemplary method of processing tentative events using multiple processors, according to an embodiment of the invention.

Turning now to FIG. 3, there is illustrated a high level logical flowchart of an exemplary method of processing tentative events using multiple processors, according to an embodiment of the invention. The process begins at block 300 in response to one of processor units 104A through 104N detecting an event and/or condition that triggers a tentative event to be committed or discarded. The processor commits and/or discards one or more tentative events within the processor's own buffer (e.g., event buffer 137A for processor unit 104A), as depicted in block 305. The processor posts the one or more commit and/or discard requests to the processing queues of each of the other processors within computer 100, as shown in block 310, and the process terminates at block 315. The processing queues of processors 104A through 104N are subsequently processed by timer interrupt handlers 105A through 105N, respectively.

In another embodiment, commit and/or discard requests that have been posted to the processing queue of a processor by another processor may instead be processed by a thread bound to the processor that periodically polls the processor's queue and processes any pending commit and/or discard requests. The present invention avoids synchronization in the event collection path at the expense of using a queue and adding processing overhead to the timer interrupt handler (or at the cost of having a dedicated thread for each processor). The present invention is more efficient in general than utilizing spin locks to synchronize access to an event buffer (i.e., for event collection and commit/discard processing), since commits/discards do not occur as frequently as the regular arrival of tentative events.

Figure 4:
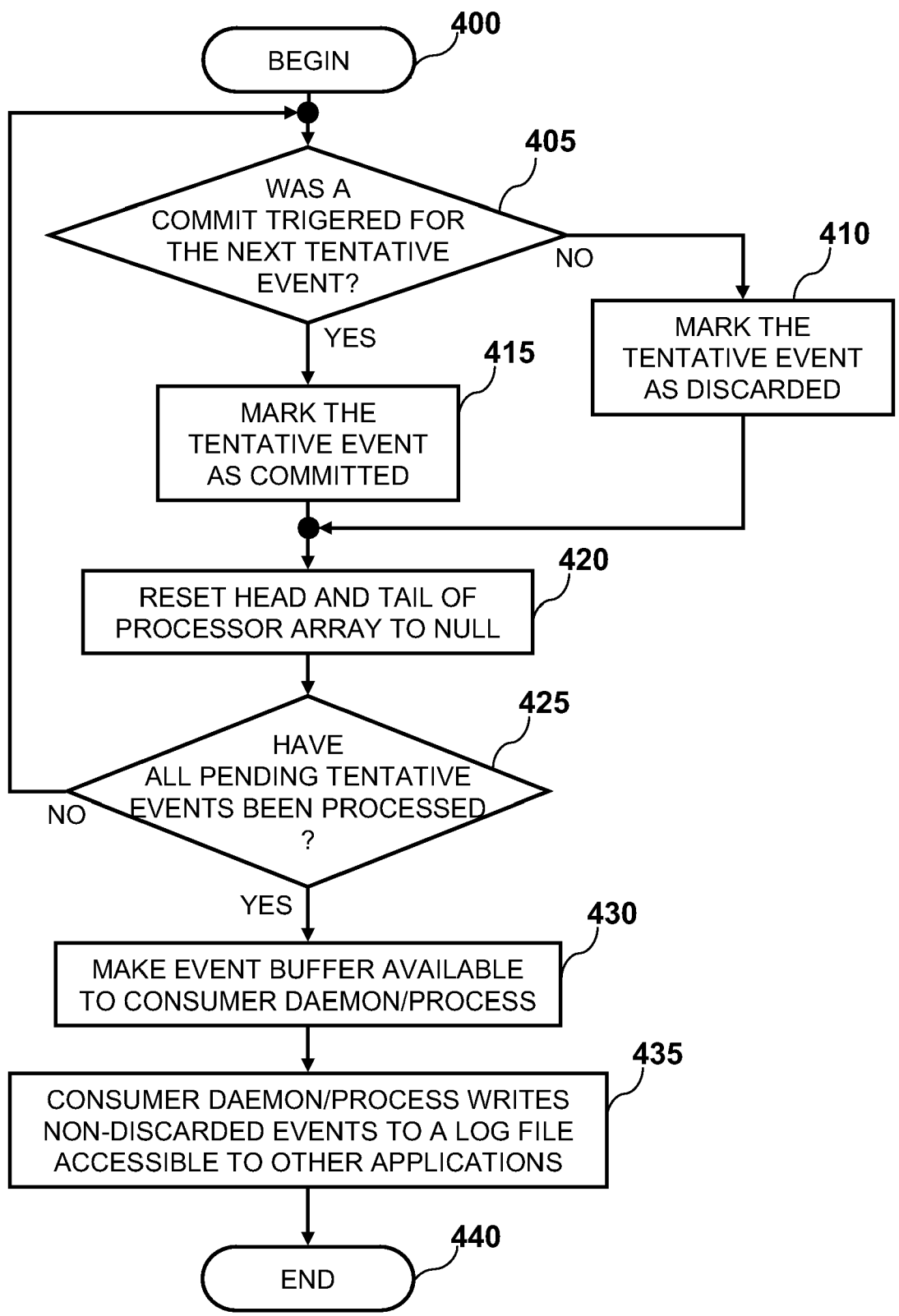
FIG. 4 is a high level logical flowchart of an exemplary method of processing a tentative thread, according to an embodiment of the invention.

With reference now to FIG. 4, there is illustrated a high level logical flowchart of an exemplary method of processing a tentative thread, according to an embodiment of the invention. The process begins at block 400 in response to a processor initiating the execution of a tentative thread. At block 405, the processor determines whether an external condition or event has triggered a pre-defined conditional statement that requires the next tentative event in the tentative thread to be committed (i.e., whether a commit has been triggered). If a commit has not been triggered, the processor marks the tentative event as discarded (i.e., changes the type field of the record for the tentative event to a "DE" value), as shown in block 410, and the process proceeds to block 420.

If an external condition or event has triggered the processor to commit a tentative event, the processor marks the tentative event as committed (i.e., changes the type field of the record for the tentative event to a "CE" value), as depicted in block 415, and the process proceeds to block 420. At block 420, the processor resets the linked list pointers within the processor array that correspond to the head and tail of the tentative thread within the processor's event buffer to a "NULL" value.

At block 425, the processor determines whether all of the pending tentative events (i.e., the entire tentative thread) have been processed. If all of the pending tentative events have not been processed, the process returns to block 405, and the processor evaluates the next pending tentative event. If all of the pending tentative events have been processed, the processor makes the event buffer that corresponds to the processor (i.e., the processor's own event buffer) available to consumer daemon 148 (FIG. 1), as depicted in block 430. In another embodiment, the processor may make the event buffer that corresponds to the processor available to another consumer process. Consumer daemon 148 subsequently writes any non-discarded tentative events to a log file that is accessible to other applications (e.g., application programs 144), as shown in block 435, and the process terminates at block 440. In one embodiment, consumer daemon 148 forwards the non-discarded tentative events directly to another application.

Figure 5:
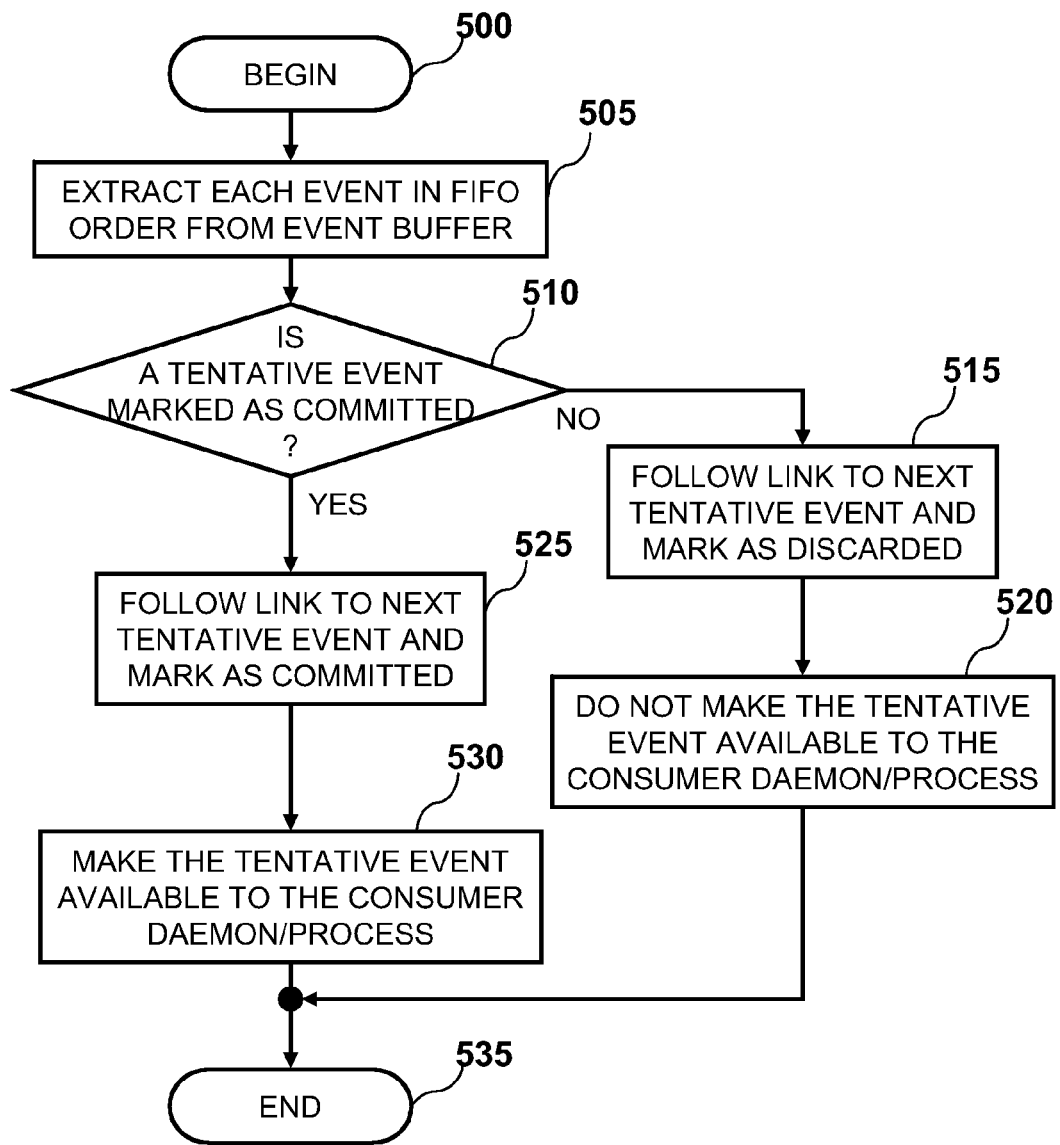
FIG. 5 is a high level logical flowchart of an exemplary method of consuming tentative events stored in an event buffer, according to an embodiment of the invention.

Turning now to FIG. 5, there is illustrated a high level logical flowchart of an exemplary method of consuming tentative events stored in an event buffer, according to an embodiment of the invention. The process begins at block 500 in response to a processor making the event buffer that corresponds to the processor available for consumption (i.e., execution) by consumer daemon 148. Consumer daemon 148 extracts each tentative event from the event buffer that corresponds to the processor in a First In First Out (FIFO) order, as depicted in block 505. Consumer daemon 148 thus extracts the first tentative event first from event buffer 137.

At block 510, consumer daemon 148 determines whether a tentative event is marked as committed (e.g., "CE0" or "CEK"). If a tentative event is not marked as committed, consumer daemon 148 follows the tentative event's link to the next tentative event in the corresponding thread and marks the next tentative event as discarded (e.g., "DE0" or "DEK"), as shown in block 515. The processor subsequently prevents the tentative event that is not marked as committed from being executed by consumer daemon 148 (i.e., discarded events are "skipped" during execution), as depicted in block 520, and the process terminates at block 535. When consumer daemon 148 identifies a tentative event as discarded, consumer daemon 148 thus marks the next tentative event in the thread as discarded prior to skipping the first tentative event. Consumer daemon 148 thereby marks each event in a "lazy" manner (i.e., only the next event is marked each time) until consumer daemon 148 reaches the end of the list of tentative events. In one embodiment, the "lazy" processing of tentative events is a recursive function that continues to the end of event buffer 137 is reached or an entry marked as a "tail" is reached.

If a tentative event is marked as committed (e.g., "CE0" or "CEK"), consumer daemon 148 follows the tentative event's link to the next tentative event in the corresponding thread and marks the next tentative event as committed, as depicted in block 525. The processor subsequently makes the tentative event that is marked as committed available to consumer daemon 148, as shown in block 530, and the process terminates at block 535. Consumer daemon 148 thereby processes both commits and discards in a "lazy" manner (i.e., without synchronization) between consumer daemon 148 and the processor that stored the events in the buffer.

The present invention thus provides a method of tentative tracing of execution events in a multiprocessor system. Each processor processes tentative events in a corresponding buffer. The processor sets a first pointer in an array corresponding to the processor to a head of a tentative execution thread and sets a second pointer in the array to a tail of the tentative thread. The processor posts commit requests and discard requests to multiple queues that correspond to each additional processor in the multiprocessor system. When an external condition triggers a tentative thread to be committed, the processor marks the first tentative event of the thread in the buffer as committed and sets the first and second pointers to a null value. When an external condition triggers the tentative thread to be discarded, the processor marks the first tentative event as discarded and sets the first and second pointers to a null value. The processor makes the buffer available to a consumer process, which extracts the first tentative event. If the first tentative event is marked as committed, the consumer process follows a link to a second tentative event in the thread and marks the second event as committed. Otherwise, the second tentative event is marked as discarded and the first tentative event is skipped by the consumer process.

It is understood that the use herein of specific names are for example only and not meant to imply any limitations on the invention. The invention may thus be implemented with different nomenclature/terminology and associated functionality utilized to describe the above devices/utility, etc., without limitation.

In the flow charts (FIGS. 3 through 5) above, while the process steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

While an illustrative embodiment of the present invention has been described in the context of a fully functional computer system with installed software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. Examples of the types of media include recordable type media such as thumb drives, floppy disks, hard drives, CD ROMs, DVDs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. In a multiprocessor computer system, a method comprising:
   storing tentative events in a buffer that corresponds to a single processor;
   setting a first pointer in an array to identify a first buffer event field containing a first tentative event that represents a head of a tentative execution thread within the buffer, wherein said array corresponds to said single processor;
   setting a second pointer in said array to identify a second buffer event field containing a tail of said tentative execution thread;
   in response to a determination that said tentative execution thread is to be committed, marking the tentative events of said tentative execution thread in the buffer as committed, wherein said marking the tentative events as committed comprises: locating the first tentative event of the tentative execution thread within the buffer using the first pointer; and marking the first tentative event of said tentative execution thread in said buffer as committed; and
   extracting tentative events that are committed from said buffer for execution by a consumer process.

2. The method of claim 1, further comprising posting commit requests and discard requests that represent tentative events stored in buffers of a plurality of additional processors to a plurality of queues that correspond to each additional processor in said multiprocessor computer system.

3. The method of claim 1, wherein said marking as committed further comprises:
   setting said first pointer to a null value when the first tentative event is marked as committed; and
   setting said second pointer to a null value.

4. The method of claim 3, further comprising:
following a link from said first tentative event to a second tentative event in said tentative execution thread in response to a determination that said first tentative event is marked as committed;
marking said second tentative event as committed in response to a determination that said first tentative event is marked as committed; and
making said first tentative event available to said consumer process in response to a determination that said first tentative event is marked as committed.

5. The method of claim 1, further comprising marking the tentative events of said tentative execution thread in the buffer as discarded in response to a determination that an external condition triggered said tentative execution thread to be discarded.

6. The method of claim 5, wherein said marking as discarded further comprises:
locating the first tentative event of the tentative execution thread within the buffer using the first pointer;
marking said first tentative event of said tentative execution thread in said buffer as discarded;
setting said first pointer to a null value when the first tentative event is marked as discarded; and
setting said second pointer to a null value.

7. The method of claim 6, further comprising:
following a link from said first tentative event to a second tentative event in said tentative execution thread in response to a determination that said first tentative event is marked as discarded;
marking said second tentative event as discarded in response to a determination that said first tentative event is marked as discarded; and
making said first tentative event unavailable to said consumer process in response to a determination that said first tentative event is marked as discarded.

8. A computer system comprising:
a plurality of processors;
a memory coupled to said plurality of processors;
a plurality of buffers in said memory that correspond to each of said plurality of processors;
a plurality of arrays in said memory that correspond to each of said plurality of processors and are associated with one of said plurality of buffers;
means for storing tentative events in a buffer that corresponds to a single processor;
means for setting a first pointer in an array to identify a first buffer event field containing a first tentative event that represents a head of a tentative execution thread within the buffer, wherein said array corresponds to said single processor;
means for setting a second pointer in said array to identify a second buffer event field containing a tail of said tentative execution thread;
in response to a determination that said tentative execution thread is to be committed, means for marking the tentative events of said tentative execution thread in the buffer as committed, wherein said means for marking the tentative events as committed comprises: locating the first tentative event of the tentative execution thread within the buffer using the first pointer; and marking the first tentative event of said tentative execution thread in said buffer as committed; and
means for extracting tentative events that are committed from said buffer for execution by a consumer process.

9. The computer system of claim 8, further comprising means for posting commit requests and discard requests that represent tentative events stored in buffers of a plurality of additional processors to a plurality of queues that correspond to each additional processor in said multiprocessor computer system.

10. The computer system of claim 8, wherein said means for marking as committed further comprises means for:
setting said first pointer to a null value; and
setting said second pointer to a null value.

11. The computer system of claim 10, further comprising means for:
following a link from said first tentative event to a second tentative event in said tentative execution thread in response to a determination that said first tentative event is marked as committed;
marking said second tentative event as committed in response to a determination that said first tentative event is marked as committed; and
making said first tentative event as available to said consumer process in response to a determination that said first tentative event is marked as committed.

12. The computer system of claim 8, further comprising means for marking the tentative events of said tentative execution thread in the buffer as discarded in response to a determination that an external condition triggered said tentative execution thread to be discarded.

13. The computer system of claim 12, wherein said means for marking as discarded further comprises means for:
locating the first tentative event of the tentative execution thread within the buffer using the first pointer;
marking said first tentative event of said tentative execution thread in said buffer as discarded;
setting said first pointer to a null value; and
setting said second pointer to a null value.

14. The computer system of claim 13, further comprising means for:
following a link from said first tentative event to a second tentative event in said tentative execution thread in response to a determination that said first tentative event is marked as discarded;
marking said second tentative event as discarded in response to a determination that said first tentative event is marked as discarded; and
making said first tentative event unavailable to said consumer process in response to a determination that said first tentative event is marked as discarded.

15. A computer program product comprising:
a computer readable non-transitory storage medium; and
program code stored on said computer readable non-transitory storage medium that that when executed provides the functions of:
storing tentative events in a buffer that corresponds to a single processor;
setting a first pointer in an array to identify a first buffer event field containing a first tentative event that represents a head of a tentative execution thread within the buffer, wherein said array corresponds to said single processor;
setting a second pointer in said array to identify a second buffer event field containing a tail of said tentative execution thread;
in response to a determination that said tentative execution thread is to be committed, marking the tentative events of said tentative execution thread in the buffer as committed, wherein said marking the tentative events as committed comprises: locating the first tentative event of the tentative execution thread within the buffer using the first pointer; and marking the first tentative event of said tentative execution thread in said buffer as committed; and extracting tentative events that are committed from said buffer for execution by a consumer process.

16. The computer program product of claim 15, further comprising code for posting commit requests and discard requests that represent tentative events stored in buffers of a plurality of additional processors to a plurality of queues that correspond to each additional processor in said multiprocessor computer system.

17. The computer program product of claim 15, wherein said code for marking as committed further comprises code for:

setting said first pointer to a null value; and
setting said second pointer to a null value.

18. The computer program product of claim 17, further comprising code for:

following a link from said first tentative event to a second tentative event in said tentative execution thread in response to a determination that said first tentative event is marked as committed;

marking said second tentative event as committed in response to a determination that said first tentative event is marked as committed; and making said first tentative event available to said consumer process in response to a determination that said first tentative event is marked as committed.

19. The computer program product of claim 15, further comprising code for marking the tentative events of said tentative execution thread in the buffer as discarded in response to a determination that said external condition triggered said tentative execution thread to be discarded.

20. The computer program product of claim 19, wherein said code for marking as discarded further comprises code for:

locating the first tentative event of the tentative execution thread within the buffer using the first pointer;

marking said first tentative event of said tentative execution thread in said buffer as discarded;

setting said first pointer to a null value;

setting said second pointer to a null value;

following a link from said first tentative event to a second tentative event in said tentative execution thread in response to a determination that said first tentative event is marked as discarded;

marking said second tentative event as discarded in response to a determination that said first tentative event is marked as discarded; and making said first tentative event as unavailable to said consumer process in response to a determination that said first tentative event is marked as discarded.

* * * * *